(No Model.)
T. GLYNN.
COFFEE POT.
No. 530,835. Patented Dec. 11, 1894.
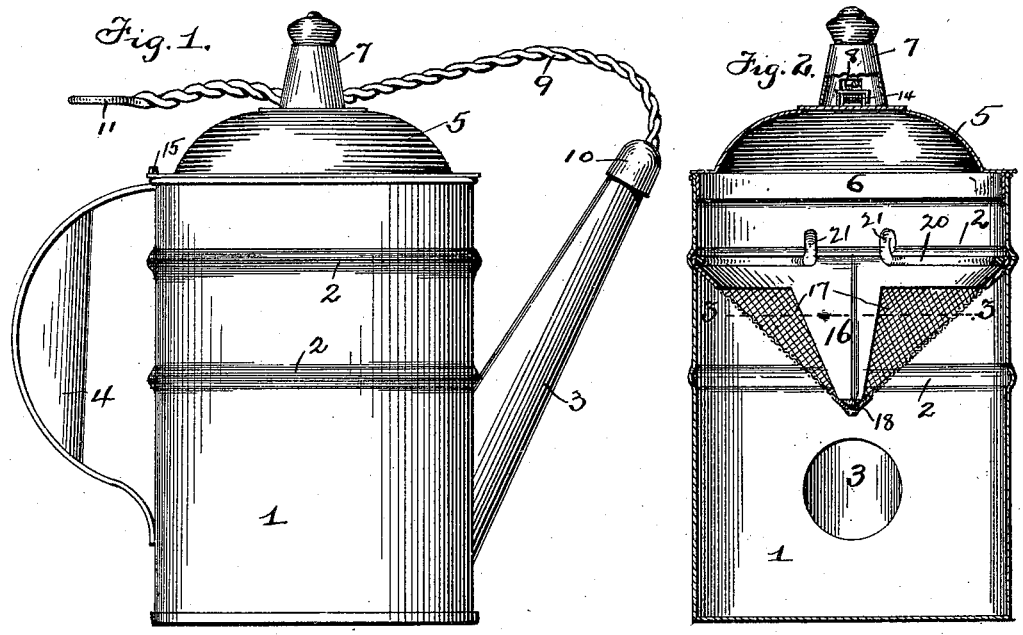
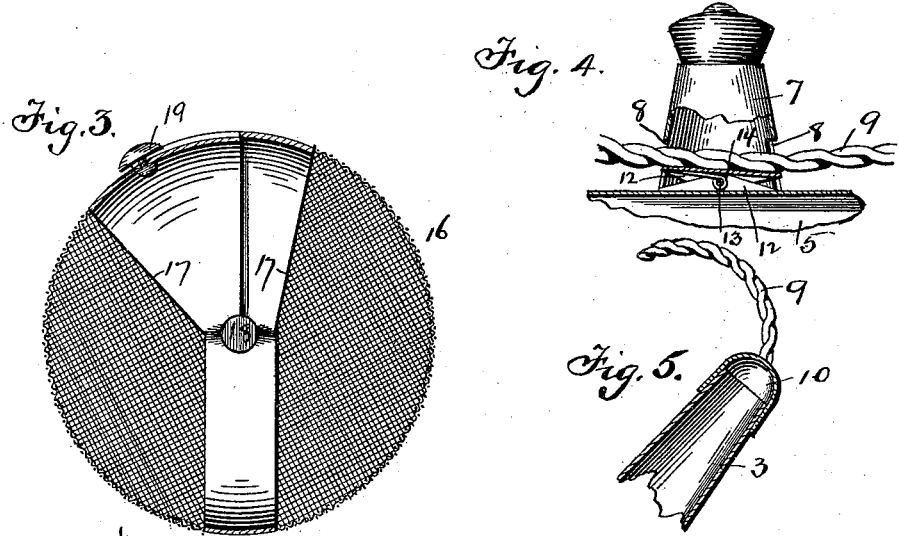
Witnesses:
H. G. Seitz
E. P. Eadson
Inventor:
Thomas Glynn,
Geo. H. Holgate
By his Attorney,

UNITED STATES PATENT OFFICE.

THOMAS GLYNN, OF PHILADELPHIA, PENNSYLVANIA.

COFFEE-POT.

SPECIFICATION forming part of Letters Patent No. 530,835, dated December 11, 1894.

Application filed March 19, 1894. Serial No. 504,223. (No model.)

*To all whom it may concern:*

Be it known that I, THOMAS GLYNN, a citizen of the United States of America, and a resident of Philadelphia, county of Philadelphia, and State of Pennsylvania, have invented a new and useful Improvement in Coffee-Pots, of which the following is a full, clear, and exact description, which will enable others skilled in the art to which it appertains to use the same.

My invention relates to improvements in coffee pots, and has for its objects to provide a coffee pot which will confine the aroma of the coffee in the coffee pot and to provide a strainer for straining the coffee from the coffee grounds, the whole to be simple in construction and operation.

With these and other objects in view, my invention consists in the improved construction and combination of parts as more particularly described anp pointed out in the claims.

In the drawings:—Figure 1— is a side elevation of my improved coffee pot. Fig. 2— is a vertical cross-section of the same. Fig. 3— is a horizontal section of the strainer, taken on line 3—3 of Fig. 2, showing the means whereby the strainer can be made larger or smaller, as needed. Fig. 4— is a detail section showing the spring for holding the spout cap in place; and Fig. 5— is a detail section of the spout cap.

Similar numerals of reference indicate similar parts in all of the figures of the drawings.

Referring to the drawings, 1 designates a coffee pot, made of any suitable material, having formed therein, ridges 2, for the purpose of forming a seat for the strainer, as hereinafter described.

3 designates a spout and 4 a handle, such as generally found on coffee pots.

5 designates the lid, with the usual flange 6, adapted to fit the top of the coffee pot.

7 designates a cone-shaped cylinder, fastened to the top of the lid by any suitable means, having openings 8, to allow of the passage therethrough of the twisted wire handle 9 of the spout-cap 10, the said wire-handle having at its opposite end from the spout-cap, a ring formed integral therewith, for the purpose of forming a thumb-piece to raise and lower the spout-cap, said ring 11 being located at a suitable distance above the handle 4.

Suitably secured to the lid, and within the cylinder 7, is an attachment consisting of two hollow frames 12, connected by a spindle 13 (as is clearly shown in Figs. 2 and 4), by means of which the frames are able to be rotated on an axis. Coiled around said spindle, is a spring 14, having its two ends extending rearwardly against the top and bottom sides respectively of the frames, thereby causing the frames to remain closed at their forward ends. To the top of the upper frame, is soldered, or otherwise secured, the twisted wire handle. By this construction, it will be obvious that the tension of the spring will hold the spout cap in position on the end of the spout, and thereby keep the aroma of the coffee in the coffee pot, until it is desired to pour the coffee from the coffee pot, when, by grasping the handle 4, of the coffee pot in one hand, and resting the thumb of the same hand on the ring 11, and pressing downward on the said ring, the spout cap will be raised and the coffee allowed to pass out through the spout. When enough coffee has been poured, by simply raising the thumb from the ring, the spout-cap will automatically return to its normal position on the end of the spout.

To insure the spout-cap registering with the end of the spout, I place a lug 15 on the coffee pot, so that it will extend upward through an opening in the lid.

It is obvious that by the above construction, the lid and the spout closing attachment may be entirely removed from the coffee pot, and thereby enable the user to have ready access to the interior for the purpose of washing or cleaning the coffee pot.

I am aware that vessels have been formed with spout closers, but as they are not removable from the vessel, or have their lids secured to the top of the vessel, it is difficult to wash or clean them easily, which I am able to do with the above construction.

16 designates a strainer, which is made slightly larger than the diameter of the coffee pot, and which is adapted to be placed in one of the ridges 2. It is made of any suitable material, and first cut round, after which an opening is made from its center to its outer edge. Triangular-shaped openings 17 are then cut in the strainer, and wire cloth, of mesh fine enough to allow of the passage therethrough of the liquid coffee, but which will not allow the coffee grounds to pass through, fastened therein. The flat circular piece is then rolled into cone shape, and at the apex of the cone, a rivet 18 is placed. The outer edges of the cone-shaped piece over-lap each other, and the outer one, is slotted laterally for the reception of a rivet 19. At the upper edge of the cone a roll is formed for the reception of a piece of wire 20, which extends partially around the top of the strainer, and has its ends bent inwardly, toward the center to form handles 21. With this construction, it will be readily seen, that when the strainer is to be placed in the coffee pot, by grasping the handles 21, and pressing them together, the strainer, by means of the slot in the outer edge, will be caused to become smaller in diameter, and allow of the ready insertion of the strainer in the coffee pot, and by freeing the handles 21, the natural spring of the metal will cause it to adapt itself to the size of the ridges 2.

Changes in form, proportion and other minor details of construction may be resorted to without departing from the principle, or sacrificing any of the advantages of this invention.

Having thus described my invention, what I claim as new, and desire to secure by Letters Patent, is—

1. A liquid receptacle, comprising in its construction, a cylindrical vessel open at its top and having a handle and spout; a removable lid adapted to fit said opening; and a handle pivotally connected to said lid, said handle having at one end a spout cup adapted to fit the end of said spout, substantially as described.

2. A liquid receptacle, comprising in its construction a cylindrical vessel, open at its top, and having a handle and spout; a removable lid adapted to fit said opening; and a spring-actuated handle pivotally connected to said lid, said handle having at one end a spout cup adapted to fit the end of said spout, substantially as described.

3. A liquid receptacle, comprising in its construction a cylindrical vessel, open at its top, and having a handle and spout; a removable lid adapted to fit said opening; and a spring-actuated handle pivotally connected to said lid, said handle having at one end a spout cup adapted to fit the end of said spout, and having its other end located above the handle of the cylindrical vessel, substantially as described.

4. A liquid receptacle, comprising in its construction, a cylindrical vessel, open at its top, and having a spout and handle; a lid adapted to fit the top of said vessel; a cone-shaped cylinder secured to the top of said lid, and having openings on opposite sides to allow of the passage therethrough of a twisted wire handle; a spring actuated frame attached to said lid and to said twisted wire handle; a twisted wire handle having at one end a spout-cap, adapted to fit the end of the spout, and having at its other end a ring formed integral therewith, said ring being located above and at a suitable distance from the handle of the coffee pot, whereby when said ring is depressed, the spout cap will be lifted from the end of the spout, and when the ring is released, the spout cap will be returned automatically to its normal position, substantially as described.

5. A liquid receptacle, comprising in its construction a cylindrical vessel, open at its top and having at opposite sides thereof a handle and a spout; a lid adapted to fit said opening, means for preventing the rotation of said lid; and a spring-actuated handle, pivotally connected to the top of said lid, said handle having at one end a spout cup adapted to fit over the end of the said spout, and having its other end located above the handle of the cylindrical vessel, substantially as described.

6. A strainer for coffee pots, comprising in its construction, a cone shaped strip of metal, having at its apex a rivet, and having its outer edges overlapping; triangular-shaped openings in said strip; wire cloth located in said openings; a slot cut in the outer overlapping edge, adapted to receive a rivet; and a strip of wire, extending partially around the top circumference of the strainer, and adapted to form handles, whereby the strainer is capable of being made larger or smaller, at the option of the user, substantially as described.

7. A strainer for coffee pots, comprising in its construction, a cone-shaped strip of metal, having at its apex a rivet and having its outer edges over-lapping; openings in said strip to receive wire cloth; handles formed at the top of said strip of metal; and means for detachably connecting said overlapping edges, whereby the strainer may be made larger or smaller, substantially as described.

In testimony that I claim the foregoing as my invention I have hereunto set my hand this 17th day of March, 1894.

THOMAS GLYNN.

Witnesses:
P. E. PIERCE,
E. P. EADSON.